March 11, 1930.　　J. W. MEADOWCROFT　　1,749,917
METHOD OF WELDING WHEEL PARTS
Filed March 21, 1928
FIG. 1.
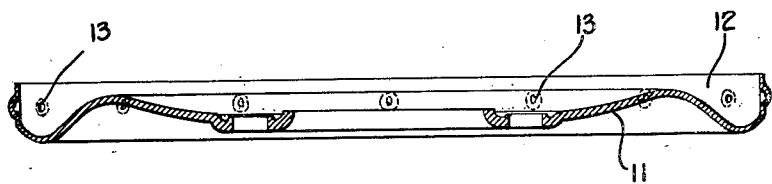
FIG. 2.
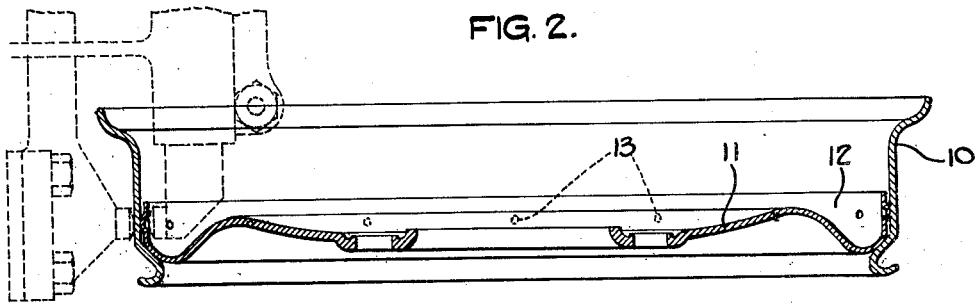
FIG. 3.
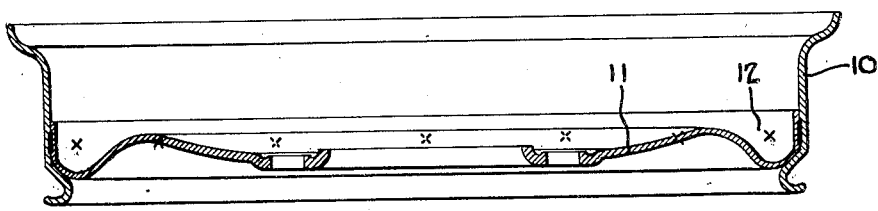
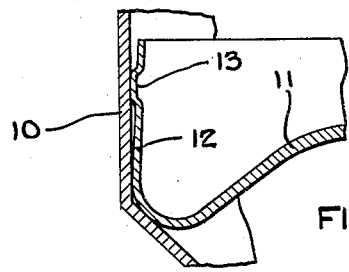
FIG. 4.
*INVENTOR.*
JOSEPH W. MEADOWCROFT.
BY
*ATTORNEY.*

Patented Mar. 11, 1930

1,749,917

UNITED STATES PATENT OFFICE

JOSEPH W. MEADOWCROFT, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

METHOD OF WELDING WHEEL PARTS

Application filed March 21, 1928. Serial No. 263,230.

The method of my invention relates to the manufacture of metal wheels and primarily to the manufacture of wheels constructed peripherally at least of metal, and its greatest adaptation is in connection with wheels constructed of metal not only in the peripheral zone but also in the main body, such for example, as wheels having main bodies comprised of discs of plate or sheet metal or spokes of plate or sheet metal. The bodies of such wheels are commonly secured to the rims through a joinder between the flange formed on the periphery of the body with some portion of the rim, usually the interior. These flanges are commonly riveted in place or secured by interlocking projections and the like. These methods of joining them are expensive and involve irregular formations appearing on the exposed surface of the wheel, such for example, as rivet heads, projections or the like. The special formations entailed are objectionable from a standpoint of difficulty in cleaning and guarding against corrosion.

Heretofore, it has been proposed to substitute spot welding for these other methods and some wheels have been spot welded, the welding being done by a standard spot welder machine, and between the contiguous faces of the rim and flange of the wheel body. Owing to the different thicknesses of the metal of the rim and the flange, to the different characteristics of the metal, and to the presence or absence of foreign matter between the surfaces to be welded, ordinary spot welding, while relatively a cheap operation, has proven disadvantageous, the welds being sometimes non-uniform and imperfect in character when not under ideal conditions, and the work requiring a considerably greater number of welds than would otherwise be the case. Furthermore, the relative thinness of the flange as compared with the rim in some circumstances introduces burning and pitting in the flange. Still further, to secure uniformly good welds the condition of the welding electrodes must be prime. As is well known, electrodes of the usual spot welder machine wear a good deal under continuous service and require considerable watching and dressing to retain them in good order. Otherwise imperfect or ugly welds result.

All the objects of my invention are founded in the avoidance of these difficulties.

According to my method, I form the flange of the wheel body or other peripheral metal part to fit the interior or other portion of the rim with which it is to be joined, preferably to make a snug close fit, or when desired a reasonably forced fit therewith, so that the two contacting faces make a close joint excluding so far as practicable foreign fluids which produce corrosion, and at the exposed joint lending themselves by reason of the peripheral fit especially adapted to fine finishes. This flange I then provide with a plurality of spuds extending radially outwardly, at least, toward the surface with which the flange fits. So many spuds are provided as there are desired welds between the rim and the wheel body. Thereupon, I force fit the spudded wheel body into the non-spudded rim. Thereby the wheel body flange and in some cases the wheel body itself is placed under initial compression, the metal of the flange being forced away from the metal of the rim in the region of the individual spuds, and perhaps the rim itself being slightly enlarged in diameter. But neither flange nor wheel body nor rim are distorted beyond the elastic limit. Thereupon I spot weld the spuds to the rim. Under the heat of the welding the spuds are reduced to the level of the flange itself, the mass of metal in the spud being restored to its old location in the body of the flange, the radial depressions of the spudding tool are leveled out, and under their inherent resilience of flange, wheel body and the rim, any or all of them, the fit of the flange within the rim is perfectly restored, the parts expanding and contracting together in the same instant that they are autogenously joined through the effect of the welds.

Incident to the scraping action of the spuds upon the rim as the wheel body is forced into assembled relation therewith, foreign matter which might interfere with the weld is cleared away and the welds therefore take place independently of the presence or absence of such foreign matter. Inasmuch as there are freshly formed spuds for each piece of work, the watching over and care of electrodes is no longer a problem. Incident to the force fit and the localized relatively higher pressure in the region of each spud and the foregoing conditions, general perfection of welds is brought about.

The accompanying drawings show the application of the method in the production of a disc wheel.

Figure 1 is an axial cross section of a wheel disc.

Figure 2 is a small section of an assembled disc and rim.

Figure 3 is a similar view of the same assembly after welding, and

Figure 4 is an enlarged detail cross section of a portion of the rim flange taken through one of the spuds before welding.

10 is the rim. 11 the disc to be joined thereto. 12 is the flange provided on the disc. It is originally formed to precisely fit the rim as shown in Fig. 3. Thereupon spuds 13 are formed projecting radially of the flange as shown in Figs. 1, 2 and 4. These spuds project sufficiently to destroy at least in the region of the spuds themselves the fit of the flange with the disc. The spudded disc of Fig. 1 is then forced into the rim taking the position shown in Fig. 2 in which the distortion of the fit results in a space between the flange and the rim shown more in detail in Fig. 4 in which the distortion is principally on the part of the flange. Thereafter, the spuds are welded by the application of the welding electrodes shown diagrammatically by dotted lines in Fig. 2. The spud is reduced under the softening heat and the electrode pressure, the metal of the flange being restorted substantially to its original condition and position in the body of the flange as shown in Fig. 3 whereupon under their resilience the parts resume their accurate fitting with each other.

All modifications of my invention I desire to cover in the annexed claims to the method and the article produced.

I claim—

1. The method of welding metal wheel bodies to rims which consists in peripherally flanging the body to fit said rim, outwardly forming spuds on said flange and thereby destroying said fit, forcing said spudded body into said rim an thereby resiliently stressing said body, and thereafter spot welding the spuds to the rim thereby relieving the stress, restoring the fit of the flange in the rim and autogeneously joining it thereto.

2. The method of welding sheet metal wheel bodies to rims which consists in peripherally forming a radially yielding flange on the body to fit the rim, outwardly forming spuds on said flange and thereby destroying said fit, forcing said spudded body into said rim and thereby distorting the flange, and thereafter spot welding the spuds to the rim whereby they are reduced to the plane of the flange and the fit of the flange and rim is restored.

In testimony whereof he hereunto affixes his signature.

JOSEPH W. MEADOWCROFT.